(12) United States Patent
Mihara

(10) Patent No.: US 8,782,747 B2
(45) Date of Patent: Jul. 15, 2014

(54) INFORMATION PROCESSING APPARATUS AND INFORMATION PROCESSING METHOD

(75) Inventor: Makoto Mihara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 749 days.

(21) Appl. No.: 12/576,095

(22) Filed: Oct. 8, 2009

(65) Prior Publication Data

US 2010/0095355 A1    Apr. 15, 2010

(30) Foreign Application Priority Data

Oct. 15, 2008    (JP) ................................ 2008-266506

(51) Int. Cl.
| | | |
|---|---|---|
| *H04L 29/06* | (2006.01) | |
| *G06Q 10/06* | (2012.01) | |
| *H04W 12/06* | (2009.01) | |
| *G06F 21/62* | (2013.01) | |

(52) U.S. Cl.
CPC ............... *G06Q 10/06* (2013.01); *H04L 63/08* (2013.01); *H04L 63/102* (2013.01); *H04L 63/10* (2013.01); *H04W 12/06* (2013.01); *G06F 21/6218* (2013.01)
USPC ................................ 726/4; 709/205; 715/744

(58) Field of Classification Search
CPC ....................... G06Q 10/06; H04N 2201/0094; H04L 63/08; H04L 63/102; H04L 63/10; G06F 21/6218; H04W 12/06
USPC .......................................................... 726/4
See application file for complete search history.

(56) References Cited

U.S. PATENT DOCUMENTS

| | | | | |
|---|---|---|---|---|
| 6,003,011 | A * | 12/1999 | Sarin et al. .................... | 705/7.26 |
| 7,953,758 | B2 * | 5/2011 | Takatsu et al. ................ | 707/796 |
| 2005/0015711 | A1 | 1/2005 | Yamamoto et al. | |
| 2008/0007766 | A1 * | 1/2008 | Sasakuma .................... | 358/1.15 |

FOREIGN PATENT DOCUMENTS

| | | |
|---|---|---|
| JP | 2005-050318 A | 2/2005 |
| JP | 2006-018492 A | 1/2006 |
| JP | 2006-128798 A | 5/2006 |
| JP | 2008-052445 A | 3/2008 |

OTHER PUBLICATIONS

Bradley J. Rhodes et al. "Automatic Discovery and Execution of Personal Applications from Shared IO Devices." 7th IEEE Consumer Communications and Networking Conference (CCNC) [2010], pp. 1-2.*

* cited by examiner

*Primary Examiner* — Thanhnga B Truong
*Assistant Examiner* — Narciso Victoria
(74) *Attorney, Agent, or Firm* — Canon U.S.A., Inc. IP Division

(57) ABSTRACT

According to the present invention, a workflow desired by a user can be easily implemented without making any change or installing any application program in an image processing apparatus. An information processing apparatus includes a generation unit which generates setting information of a button related to execution of a work item, which is included in a screen displayed on an image processing apparatus according to a user, based on an activity corresponding to the work item and information of a user, who can execute the work item, acquired based on a role allocated to the work item, when the work item is generated that represents a work executed by a person in charge in an activity which is a work unit of a workflow executed in the image processing apparatus; and a transmission unit which transmits the setting information generated in the generation unit to the image processing apparatus.

15 Claims, 16 Drawing Sheets

FIG.5

| STAFF MEMBER | SENIOR STAFF MEMBER | GENERAL MANAGER |
|---|---|---|
| USER A<br>USER C | USER B | USER D |

| WI ID | WF ID | TYPE | USER WHO CAN EXECUTE WI |
|---|---|---|---|
| 000001 | 0000001 | SCAN TRANSMISSION | User1<br>User2 |
| 000102 | 0000010 | PRINTING | User1<br>User2 |
| 000303 | 0000100 | SCAN TRANSMISSION | Manager1 |
| 000508 | 0000150 | PRINTING | Manager2 |
| 000801 | 0000178 | SCAN TRANSMISSION | User3 |
| 001201 | 0000234 | PRINTING | User4 |
| 002202 | 0000318 | PRINTING | Manager1<br>Manager2 |

FIG.16

| IMAGE FORMING APPARATUS | IP ADDRESS |
|---|---|
| 000001 | 192.168.0.1 |
| 000002 | 192.168.0.2 |
| 000003 | 192.168.0.3 |

INFORMATION PROCESSING APPARATUS AND INFORMATION PROCESSING METHOD

BACKGROUND OF THE INVENTION

1. Field of the Invention

The present invention relates to an information processing apparatus and an information processing method for executing a workflow.

2. Description of the Related Art

A system which defines a series of works by a workflow of drafting→application→approval→settlement and automates the flow of a work, for example, a business form scan solution, has been suggested. In the system, a paper document such as a business form is scanned and took around together with work data as an attached document within a workflow. For example, in a workflow for applying for travel expenses, a receipt is attached to a drafted application using a scan function via an image processing apparatus and the application is processed. Japanese Patent Application Laid-Open No. 2005-50318 relates to a workflow system for implementing a document flow, which provides a plurality of user interfaces (UIs) when various steps of a workflow are executed. A workflow management apparatus which displays a screen according to an execution environment of a person in charge such as a personal computer (PC), a mobile device, and a multi-function peripheral (MFP) device has been suggested. With these apparatus, a user can participate in the document flow.

For example, by the technique discussed in Japanese Patent Application Laid-Open No. 2005-50318, a workflow can be executed using an UI optimum for an execution environment of a workflow participant terminal. However, in displaying a prepared UI, a program for displaying an UI on each terminal is required. For example, in the case of an image forming apparatus, a workflow-dedicated program needs to be installed and continuously updated along with renewals of a workflow or a device.

SUMMARY OF THE INVENTION

The present invention is directed to an information processing apparatus and an information processing method in which a workflow desired by a user can be easily executed without making any change or installing any application program in an image processing apparatus.

According to an aspect of the present invention, an information processing apparatus, includes a generation unit which generates setting information of a button related to execution of a work item, which is included in a screen displayed on an image processing apparatus according to an operation of a user, based on an activity corresponding to the work item and information of a user, who can execute the work item, acquired from a role allocated to the work item, when the work item is generated that represents a work executed by a person in charge in an activity which is a work unit of a workflow executed in the image processing apparatus communicable via a network; and a transmission unit that can communicate via a network which transmits the setting information generated in the generation unit to the image processing apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 illustrates an example of a relationship between a role and a user.

FIG. 13 illustrates an example of information of a work item (a device work item), which is to be executed in a device such as an image forming apparatus and is stored in a server apparatus.

FIG. 16 illustrates an example of information about an image forming apparatus managed by a server apparatus.

DESCRIPTION OF THE EMBODIMENTS

Various exemplary embodiments, features, and aspects of the invention will be described in detail below with reference to the drawings.

First, terms used in the present invention are defined as follows.

1) Definition of a process: definition of a workflow.
2) Activity: a work unit in a workflow.
3) Work item (WI): a concrete work executed by a person in charge in the activity.
4) Scan transmission: a function of an image processing apparatus which scans and converts an original manuscript into electronic data and transmits the electronic data using an e-mail or a protocol such as a file sharing protocol (a server message block (SMB)) or a file transfer protocol (FTP).

Figure 1:
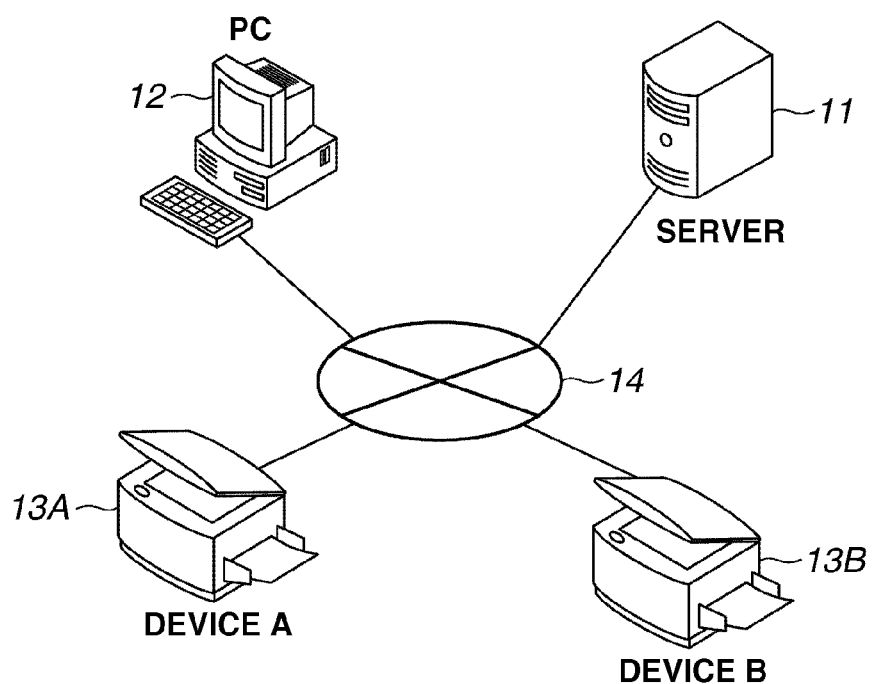
FIG. 1 illustrates an example of a system configuration of a workflow processing system.

FIG. 1 illustrates an example of a system configuration of a workflow processing system.

The workflow processing system includes a server apparatus 11 which is a workflow execution apparatus, a PC client 12, and image forming apparatuses 13A and 13B. The respective apparatuses are connected via a network 14 and may communicate data using a protocol such as a transmission control protocol/internet protocol (TCP/IP) or a simple network management protocol (SNMP). In other words, the server apparatus 11 and the image forming apparatuses 13A and 13B are connected and can communicate with each other via the network 14. The number of the respective apparatuses is not limited, and the image forming apparatus is only an example of an image processing apparatus.

In the present workflow processing system, it is assumed that one server apparatus 11, one PC client 12, and two image forming apparatuses 13A and 13B are connected with each other. It is also assumed that the server apparatus 11 manages an image forming apparatus which can execute a workflow.

Figure 2:
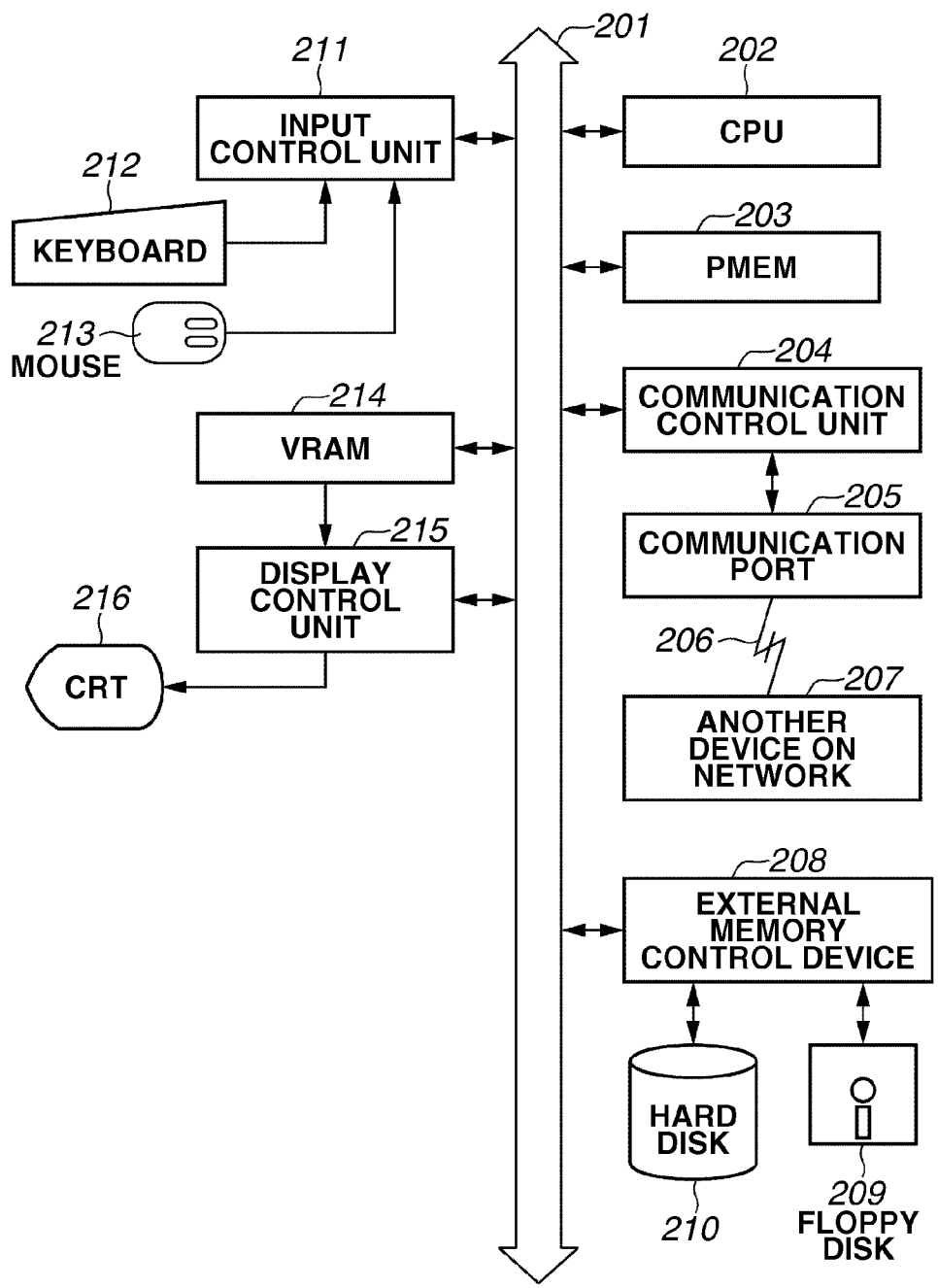
FIG. 2 illustrates an example of a hardware configuration of a server apparatus.

FIG. 2 illustrates an example of a hardware configuration of the server apparatus 11.

A system bus 201 is connected to respective configuration blocks described below. A central processing unit (CPU) 202 selects an appropriate program from a hard disk 210, loads the program in a program memory (PMEM) 203 and executes the program to perform a function of the server apparatus 11 or processing related to a flowchart which will be described below. Data input from a keyboard 212 is stored as code information in the PMEM 203, which also functions as a text memory. A communication control unit 204 controls input/output data of a communication port 205. A signal output from the communication port 205 is transmitted to a communication port of another apparatus on a network through a communication line 206.

The present exemplary embodiment is described focusing on a network such as a local area network (LAN). However, a general public line may also be used as a communication port and a communication line which are connected to the communication control unit 204.

The server apparatus 11 includes an external memory device control unit 208, and disks 209 and 210 for storing data files. For example, the disk 209 is a flexible disk (FD) and the disk 210 is a hard disk (HD).

An input control unit 211 is connected to an input apparatus such as the keyboard 212 and a mouse 213. An operator operates the keyboard 212 to give instructions for a system operation.

A pointing device (PD) 213 processes and indicates image information on a cathode ray tube (CRT) 216. In the present exemplary embodiment, a mouse is used as the pointing device 213. The mouse 213 does not only arbitrarily move a cursor on the CRT 216 in an X or Y direction, selects a command icon on a command menu and gives instructions for the processing, but also indicates an edit target and a drawing location. Further, the server apparatus 11 includes a display output control unit 215. Data to be displayed on the CRT 216 is rasterized as bit map data on a video image memory (VRAM) 214.

In the present exemplary embodiment, a program stored in a read only memory (ROM) may be stored in a storage medium such as a HD or a FD, which is directly connected to the apparatus, or to another storage apparatus connected via a network.

Figure 3:
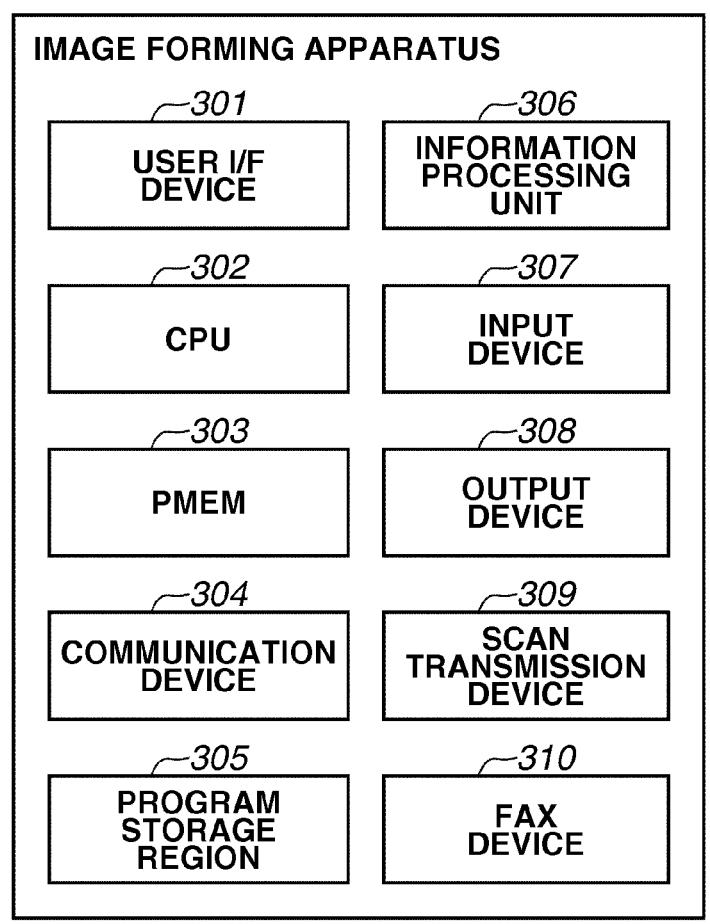
FIG. 3 illustrates an example of a configuration of an image forming apparatus.

FIG. 3 illustrates an example of a configuration of the image forming apparatuses 13A and 13B. In the present exemplary embodiment, a block diagram in which all functions are present is illustrated. However, when apparatuses have functions different from the present exemplary embodiment, a certain function may not be present in the apparatuses. A user I/F device 301 performs processing such as an operation of an apparatus by a user or displaying information to a user. A CPU 302 selects a program from a program storage region 305 as needed, loads the program into a program memory (PMEM) 303 and executes the program. Data input from the user I/F device 301 or image data read by an input device 308 are stored in the PMEM 303. A communication device 304 controls access to a network or data input/output via a network.

The present exemplary embodiment is described focusing a network such as a LAN. However, a general public line may also be used as a communication line connected to the communication device 304. A program storage region 305 includes a hard disk or a ROM. A function information processing unit 306 stores or provides function information possessed by the image forming apparatus and manages a button to be displayed on a user I/F. The function information processing unit 306 may be configured by hardware, or software implemented when the CPU 302 executes a program. An input device 307 performs image reading processing. An output device 308 performs image data output processing. A scan transmission device 309 transmits input image data as an e-mail or a file. A FAX device 310 transmits or receives a FAX.

Next, a workflow will be described with reference to FIGS. 4 to 6.

Figure 4:
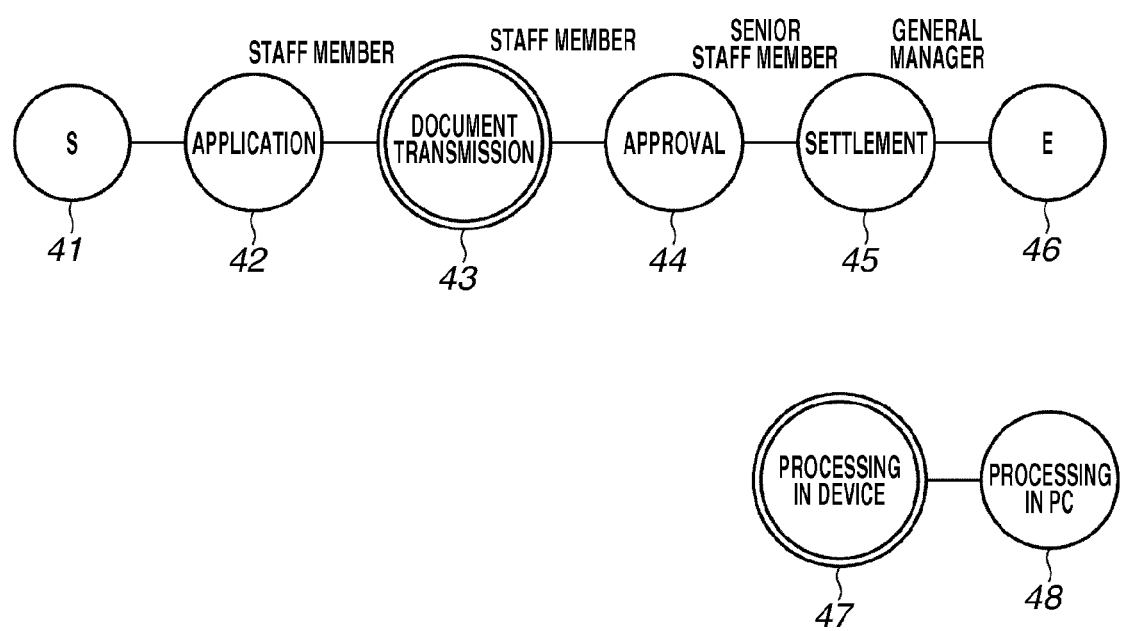
FIG. 4 illustrates an example of a process definition of a workflow.

FIG. 4 illustrates an example of a process definition of a workflow.

A workflow according to the present exemplary embodiment includes activities 42 to 45. Each activity is classified as either an activity 47 which has to be processed in the image forming apparatus or an activity 48 which has to be processed in the PC client. In FIG. 4, the activities which are indicated by a solid line, that is, the application activity 42, the approval activity 44, and the settlement activity 45, are the activities which are processed in the PC client. The activity which is indicated by a double line, that is, the document transmission activity 43, is the activity which is processed in the image forming apparatus.

A role for specifying a performer of each activity is allocated to each activity. A staff member role is allocated to the application activity 42 and the document transmission activity 43. A senior staff member role is allocated to the approval activity 44, and a general manager role is allocated to the settlement activity 45. The present workflow processing system generates a work item of a user having a role set to an activity to be processed next each time an activity is finished. The document transmission activity 43 illustrated in FIG. 4 is executed by transmitting a scanned document to the server apparatus 11.

FIG. 5 illustrates an example of a relationship between a role and a user.

Roles and users of the present exemplary embodiment are as follows:
 a staff member role: user A and user C;
 a senior staff member role: user B; and
 a general manager role: user D.

Figure 6:
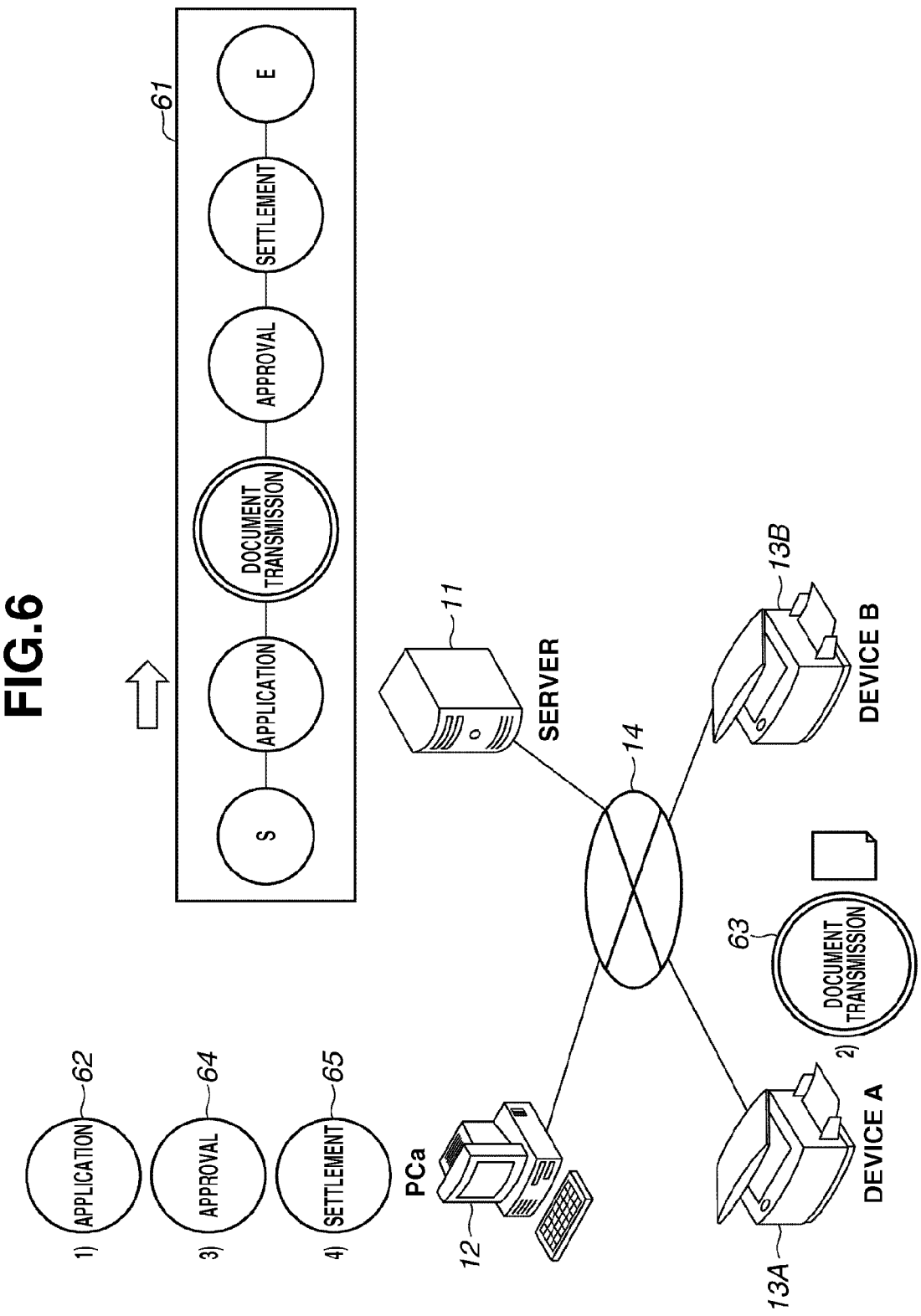
FIG. 6 illustrates an example of an operation of a workflow processing system.

FIG. 6 illustrates an example of an operation of a workflow processing system.

FIG. 6 illustrates one example operation, in which a workflow 61 is managed by the sever apparatus 11 and respective activities are processed in order. When a workflow starts, a work item of a user having a role set to an application activity which is a first activity is generated in the server apparatus 11. When the user processes an application work item through the PC client 12 (62), a next document transmission work item is generated in the server apparatus 11 and processed in the image forming apparatus. The document transmission work item is executed when the image forming apparatus 13A scans a document and transmits the scanned document to the server apparatus 11 (63). Thereafter, approval processing 64 and settlement processing 65 are executed through the PC client 12, and the workflow 61 is completed.

Figure 7:
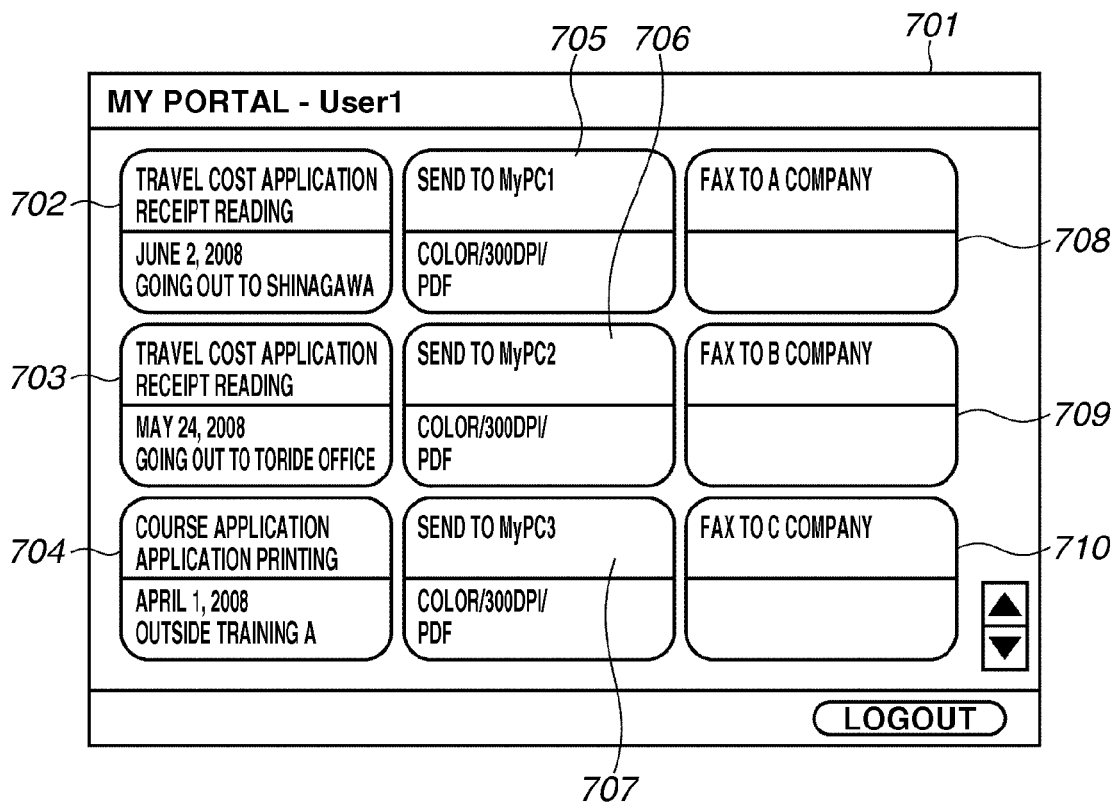
FIG. 7 illustrates an example of a portal screen displayed on an image forming apparatus.

FIG. 7 illustrates an example of a portal screen displayed on the image forming apparatuses 13A or 13B.

When a user logs in, the image forming apparatus displays a portal screen 701 set for each user on the user I/F device 301. FIG. 7 illustrates a screen displayed when User 1 logs in. Buttons 702 to 710 implement functions of the image forming apparatus by one action. The function information processing unit 306 stores a setting content of a button (setting information of a button) for each user, and display is performed based on the setting information. The setting information of the button is transmitted from the server apparatus 11 as will be described below. Buttons 702 to 704 execute work items. A name of a workflow, a name of an activity corresponding to a work item, and a comment set to a workflow are displayed on the buttons. Buttons 705 to 710 execute general functions. In particular, buttons 705 to 707 perform scan transmission to a certain folder, and buttons 708 to 710 transmit a FAX to respective destinations.

A series of flows after a work item to be executed in the image forming apparatus is generated in the server apparatus 11 until execution of a work item is finished will be described with reference to FIGS. 8 to 13.

Figure 8:
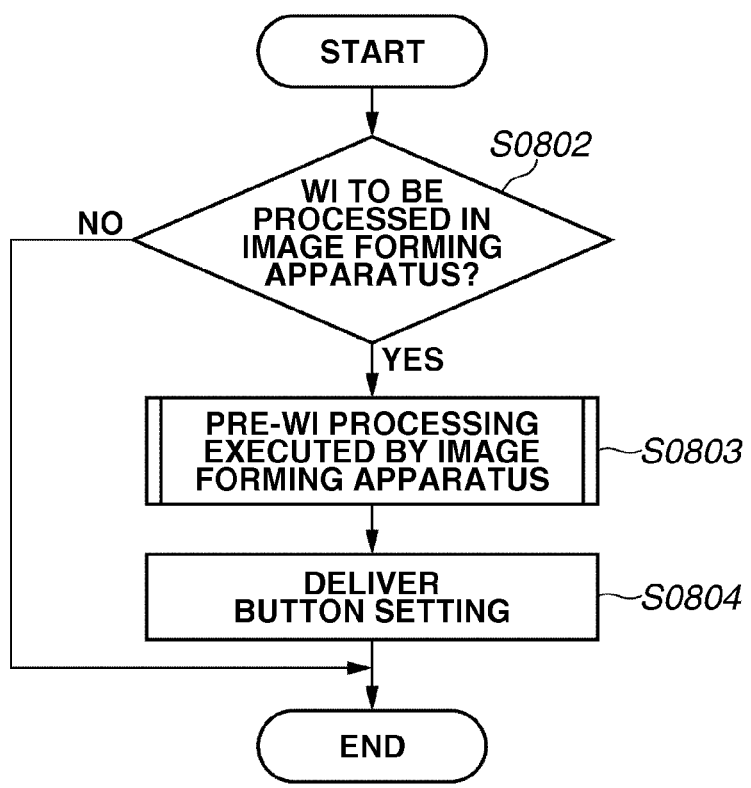
FIG. 8 is a flowchart illustrating an example of processing in which a sever apparatus transmits button setting when a new work item is generated.

FIG. 8 is a flowchart illustrating an example of processing in which the sever apparatus 11 transmits button setting when a new work item is generated.

In step S0802, when a new work item is generated, the server apparatus 11 determines whether the work item is to be processed in the image forming apparatus. In step S0803, when it is determined that the work item is to be processed in the image forming apparatus (YES in step S0802), the server apparatus 11 performs pre-processing (for example, processing for generating button setting information) for the work item executed by an image forming apparatus. Detailed processing of step S0803 will be described below with reference to FIG. 9. In step S0804, the server apparatus 11 transmits button setting (button setting information) to all image forming apparatuses managed by the server apparatus 11.

Figure 9:
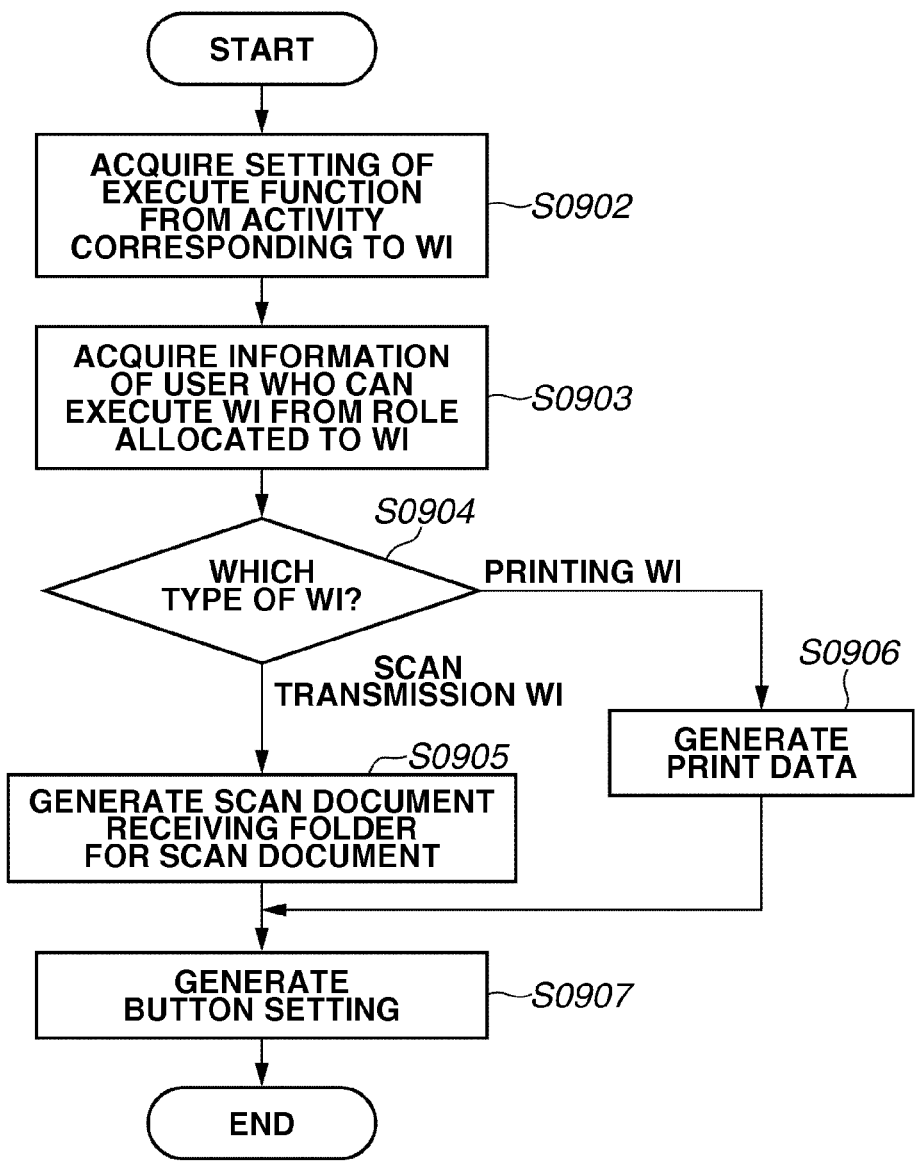
FIG. 9 is a flowchart illustrating an example of detailed processing of step S0803 of FIG. 8.

FIG. 9 is a flowchart illustrating an example of detailed processing of step S0803 of FIG. 8. In step S0902, the server apparatus 11 acquires setting of a function to be executed in the image forming apparatus from an activity corresponding to a work item. The setting includes, for example, a resolution at a time of scanning an image, color/monochrome setting, a method for generating a scan data file, or a printing format (N-up or staple). In step S0903, the server apparatus 11 acquires information of a user who can execute a work item from a role allocated to the work item. Then, the server apparatus 11 determines user's portal screen in which a button is registered. In step S0904, the server apparatus 11 determines whether a type of a work item is a scan transmission work item or a printing work item.

In step S0905, when it is determined that a type of a work item is a scan transmission work item, the server apparatus 11 generates a receiving folder which receives scanned data transmitted from the image forming apparatus (folder generation). The server apparatus 11 uniquely identifies a receiving folder of each work item and manages associated information between a work item and a receiving folder. The server apparatus 11 grants a right (an access right) to access a receiving folder to a user acquired in step S0903.

In step S0906, when it is determined in step S0904 that a work item is a printing work item, the server apparatus 11 generates print data (print data generation). The server apparatus 11 uniquely identifies print data of each work item and manages associated information between a work item and print data. The server apparatus 11 grants a right (an access right) to access print data to a user acquired in step S0903.

In step S0907, the server apparatus 11 determines (or generates) a setting content (setting information) of a button to be registered for a portal screen.

Through above-described processing, registration of a button (setting information generation of a button) for executing a work item which is to be processed in the image forming apparatus is finished.

Figure 10:
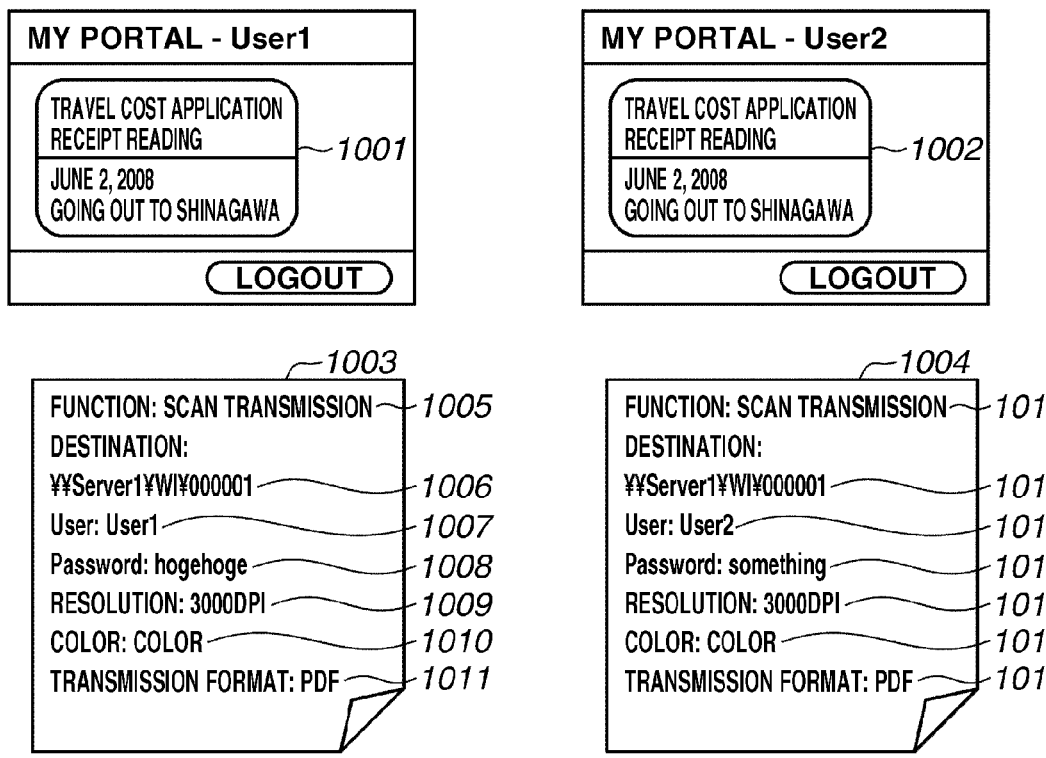
FIG. 10 is an example of a setting content and a button for a scan transmission work item.
Figure 11:
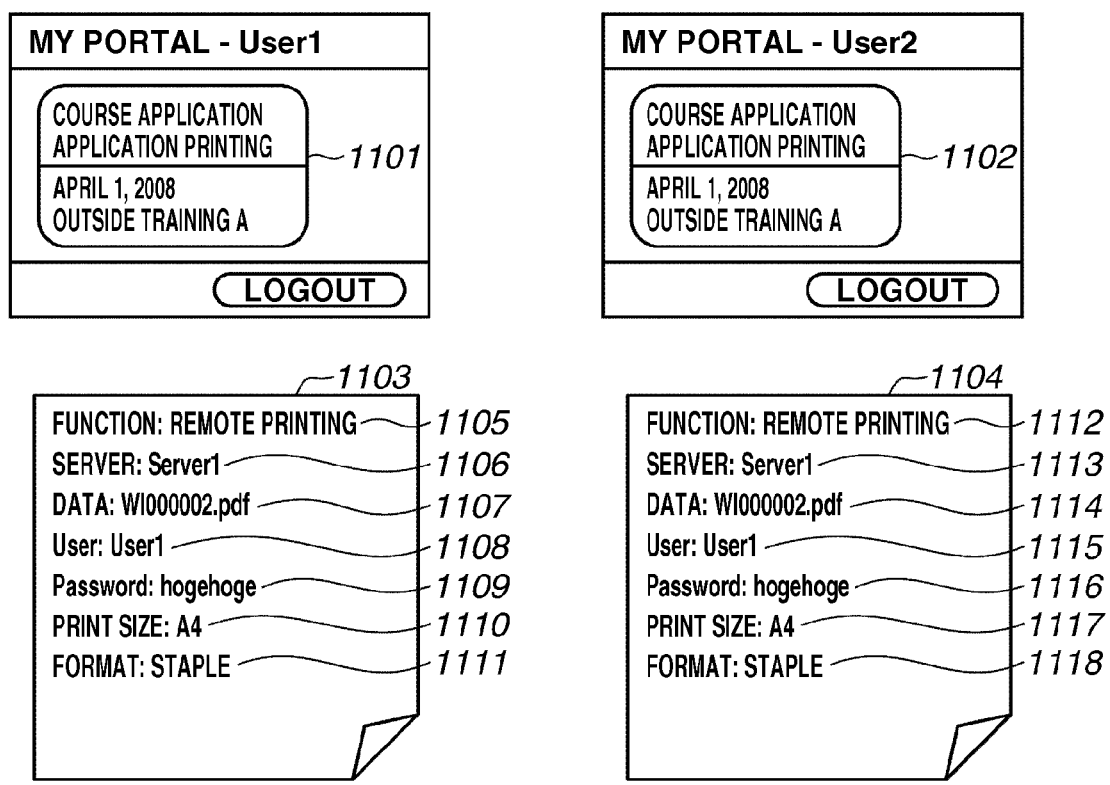
FIG. 11 is an example of a setting content and a button for a printing work item.

FIGS. 10 and 11 illustrate an example of a setting content of a button transmitted to the image forming apparatus in step S0804 and a button displayed on a portal screen based on the setting content. FIG. 10 is an example of a setting content and a button in the case of a scan transmission work item, and FIG. 11 is an example of a setting content and a button in the case of a printing work item. The setting content is stored in the function information processing unit 306 of the image forming apparatus. In the present exemplary embodiment, buttons of work items which User 1 and User 2 can execute are registered in a portal screen of User 1 and a portal screen of User 2 of the image forming apparatus 13A, respectively, are illustrated.

In FIG. 10, a button 1001 is registered (displayed) in the portal screen of User 1, and a button 1002 is registered (displayed) in the portal screen of User 2. Setting contents 1003 and 1004 are set to the respective buttons. Settings of a function 1005 and 1012 represent scan transmission. Settings of a destination 1006 and 1013 represent a path of a receiving folder generated by the server apparatus 11 in step S0905. The path is an example of location information of a receiving folder. A work item can be uniquely identified by the folder. With user names 1007 and 1014, folders are accessed. User 1 is set in the portal screen of User 1, and User 2 is set in the portal screen of User 2.

Therefore, a user who has executed a work item can be identified through an access user of a folder. With passwords 1008 and 1015, folders are accessed. Passwords are set corresponding to User 1 and User 2, respectively. Settings 1009 to 1011 and 1016 to 1018 are settings for scan transmission, respectively, and values acquired by the server apparatus 11 in step S0902 are set. Resolutions 1009 and 1016 at the time of scanning, colors 1010 and 1017 at the time of scanning, and file formats of data to be transmitted 1011 and 1018 are set. Setting of scan transmission is not limited to this example, and all values which can be set by a general scan transmission function can be set.

In FIG. 11, a button 1101 is registered (displayed) in the portal screen of User 1, and a button 1102 is registered (displayed) in the portal screen of User 2. Setting contents 1103 and 1104 are set to the respective buttons. Settings of a function 1105 and 1112 represent remote printing. The remote printing is a function to acquire print data present in another server and the image forming apparatus and to print the data. Settings 1106 and 1113 are a server in which print data is present and represent the server apparatus 11 in this example. Print data 1107 and 1114 represent print data generated in step S0906. A work item can be uniquely identified by the data. With user names 1108 and 1115, the server apparatus 11 is accessed.

User 1 is set in the portal screen of User 1, and User 2 is set in the portal screen of User 2. Therefore, a user who has executed a work item can be identified through an access user of the server apparatus 11. Passwords 1109 and 1116 are for having access to the server apparatus 11. Passwords are set corresponding to User 1 and User 2, respectively. Settings 1110 and 1111, and 1117 and 1118 are made in the case of remote printing, respectively, and values acquired by the server apparatus 11 in step S0902 are set. Settings 1110 and 1117 are paper sizes at the time of printing. Settings 1111 and 1118 are printing formats. Setting of remote printing is not limited to this example, and all values which can be set by a remote printing function can be set.

Figure 12:
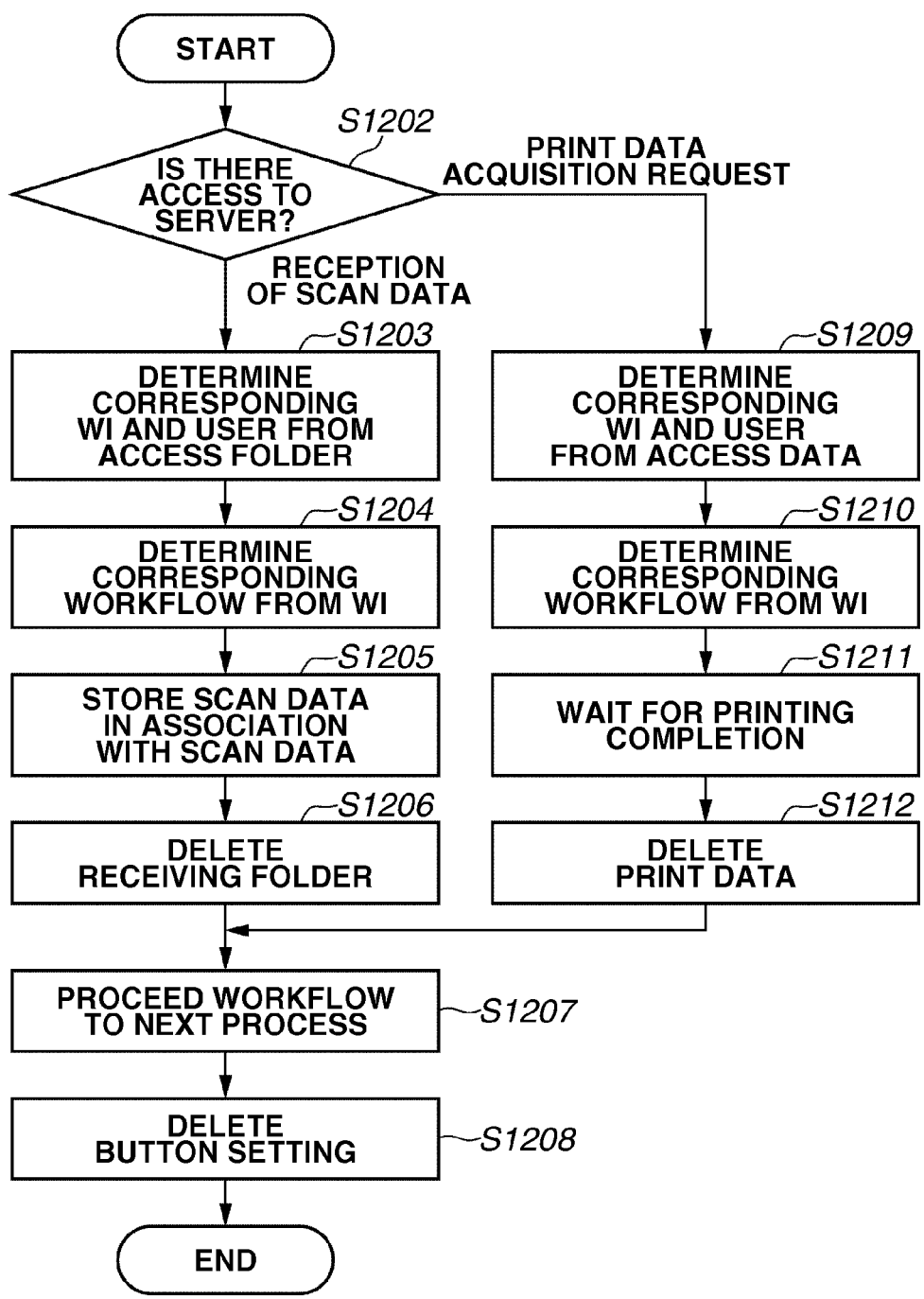
FIG. 12 is a flowchart illustrating an example of processing for monitoring execution of a work item in the server apparatus 11 and post processing after the processing for monitoring execution.

FIG. 12 is a flowchart illustrating an example of processing for monitoring execution of a work item in the server apparatus 11 and post processing after the processing for monitoring execution.

The server apparatus 11 monitors execution of a work item. In step S1202, when there is access from the image forming apparatus, it is determined whether the access has been made to receive scan data or receive a print data acquisition request. In step S1203, when scan data is received, the server apparatus 11 uniquely determines a corresponding work item using associated information based on a folder to which data is transmitted. The server apparatus 11 determines a user who has executed the work item based on information of a user which has accessed a folder. In step S1204, the server apparatus 11 determines a corresponding activity and a workflow based on the work item. In step S1205, the server apparatus 11 stores scan data in association with the workflow (or an activity). In step S1206, the server apparatus 11 deletes the receiving folder generated in step S0905.

In step S1207, the server apparatus 11 advances the workflow to the next process (processing of a next activity). In step S1208, the server apparatus 11 deletes all buttons registered in the image forming apparatus in step S0804. More specifically, the server apparatus 11 transmits a request to delete the buttons to all of image forming apparatuses to which button setting information has been transmitted (deletion request transmission). The image forming apparatus which has received the deletion request deletes a button requested in the deletion request, which is stored in the function information processing unit 306 or the like.

In step S1209, when it is determined in step S1202 that a print data acquisition request has been received, the server apparatus 11 uniquely determines a corresponding work item using associated information based on the data about which the print data acquisition request has been made. The server apparatus 11 determines a user who has executed the work item from information of a user which has accessed the data. In step S1210, the server apparatus 11 determines a corresponding workflow (or activity) based on the work item. In step S1211, the server apparatus 11 waits for printing completion. As a method for waiting for printing completion, several methods may be considered, and in the exemplary embodiment, it is not limited to a certain printing completion waiting method. For example, a status of a printing work of the image forming apparatus may be checked or print data may be deleted when a data deletion request is received from the image forming apparatus using a data deletion function after printing of remote printing. In step S1212, the server apparatus 11 deletes the print data. More specifically, the server apparatus 11 deletes the print data after the waiting for printing completion ends. Processing subsequent to step S1207 is identical to the processing described above.

FIG. 13 illustrates an example of information of a work item (a device work item), which is to be executed in a device such as the image forming apparatus and is stored in the server apparatus. Information of all device work items 1301 is currently executable. A WI ID 1302 is information for uniquely identifying a work item. A WF ID 1303 is an ID for uniquely identifying a workflow corresponding to a work item. A type 1304 is information which represents whether a work item is scan transmission or printing. A user 1305 who can execute is information (user information) of a user who can execute a work item.

As described above, by performing processing described with reference to FIGS. 8 to 13, a button on the image forming apparatus can be displayed or deleted according to progress of a workflow, and processing of an image forming apparatus execution work item can be executed.

Figure 14:
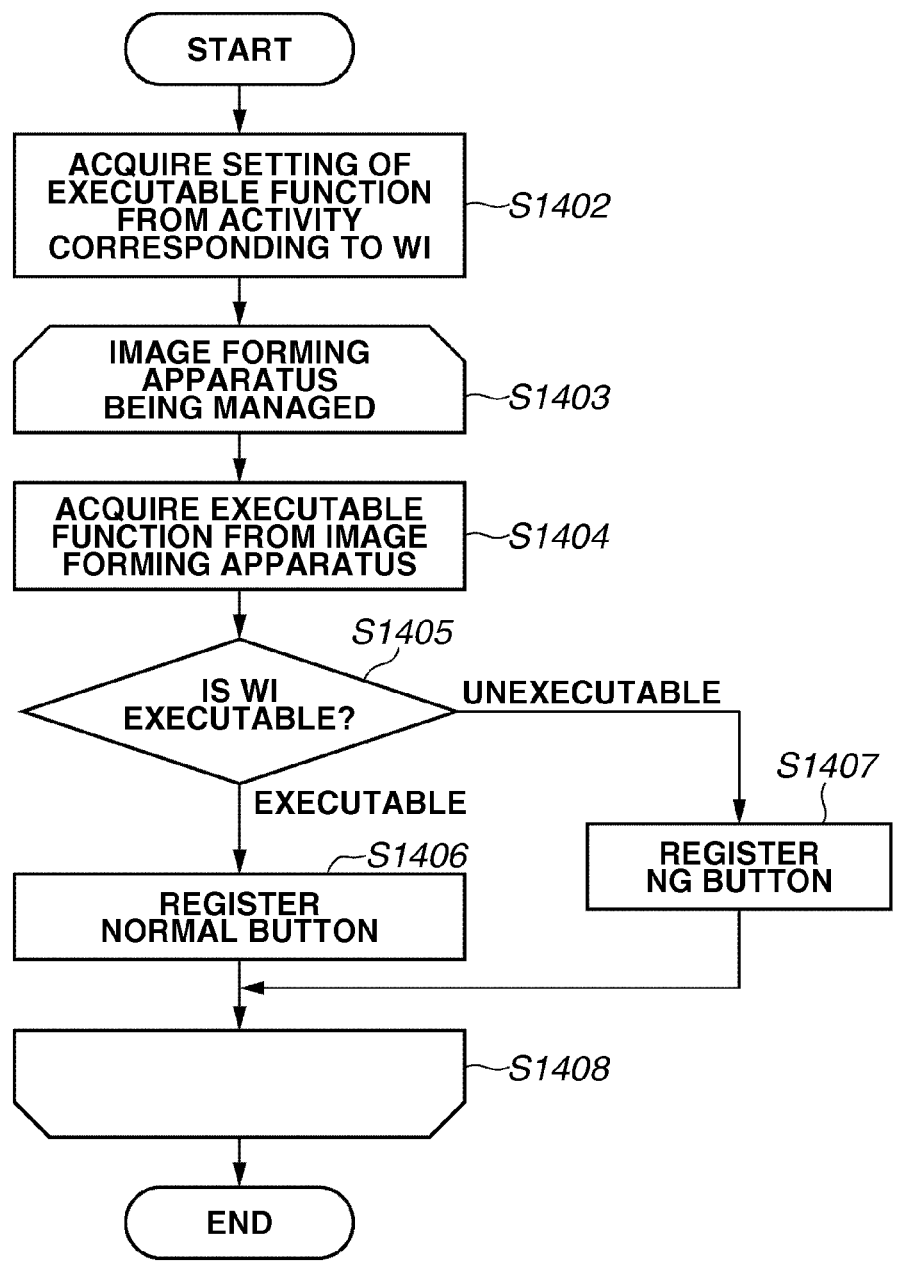
FIG. 14 is a flowchart illustrating an example of processing of changing setting information of a button according to a function of an image forming apparatus.
Figure 15:
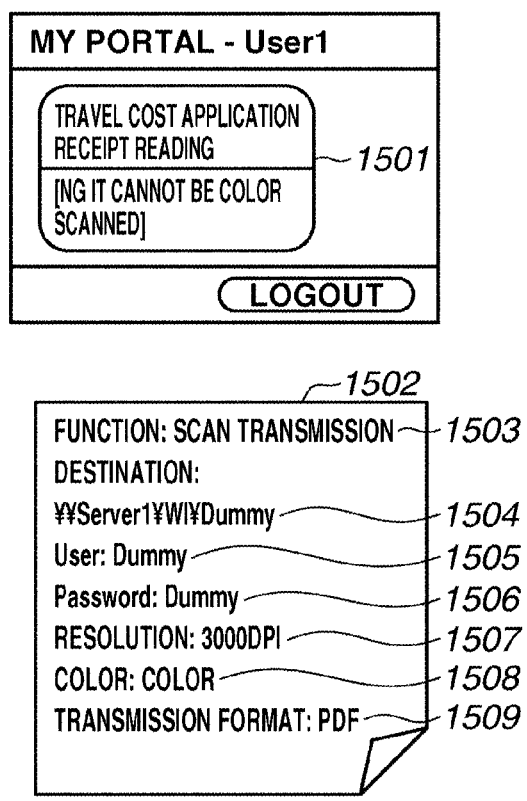
FIG. 15 illustrates an example of a setting content of an NG button.

Next, with reference to FIGS. 14 and 15, it is checked whether processing of a work item related to a button to be registered can be executed by a function of the image forming apparatus when the server apparatus 11 registers a button in the image forming apparatus, and a button different from the above-mentioned button is registered when processing of the work item cannot be executed. FIG. 14 is a flowchart illustrating an example of processing for changing setting information of a button according to a function of the image forming apparatus.

In step S1402, the server apparatus 11 acquires setting of a function to be executed in the image forming apparatus from an activity corresponding to a work item. In steps S1403 to S1408, the server apparatus 11 performs processing for all of image forming apparatuses managed by the server apparatus 11. In step S1404, the server apparatus 11 acquires information (function information) of a function which can be executed by the image forming apparatus from the image forming apparatus.

In step S1405, the server apparatus 11 compares a function to be executed in the image forming apparatus and acquired in step S1402 and a function of the image forming apparatus acquired in step S1404, and determines whether a work item is the processing which can be executed in the image forming apparatus. In step S1406, when it is determined that a work item is the processing which can be executed, the server apparatus 11 performs normal button registration. The normal button registration refers to processing of steps S0803 and S0804 of FIG. 8 described above.

In step S1407, however, when it is determined that a work item is the processing which cannot be executed, the server apparatus 11 performs registration of a no good (NG) button. More specifically, the server apparatus 11 generates setting information as illustrated in FIG. 15 which will be described below and transmits the setting information to the image forming apparatus. The setting information is generated to display a reason that a work item cannot be executed, on a title of the NG button. The setting information includes scan transmission setting or remote printing setting, which causes an error to occur when the NG button is pressed down in the image forming apparatus.

FIG. 15 illustrates an example of a setting content of the NG button.

A button 1501 is an example, which is displayed based on a setting content (setting information) of the NG button. A reason that a work item cannot be processed in the image forming apparatus is displayed. Setting contents 1502 are set to the NG button. In this example, a destination which is not present is set to 1504, a user which is not present is set to 1505, and a password which is not present is set to 1506. Therefore, if a user presses this button (the NG button) down, actual scan transmission is treated as an error.

FIG. 16 illustrates an example of information of the image forming apparatus managed by the server apparatus 11. The server apparatus 11 performs button transmission of step S0804 or steps S1403 to S1408 based on this setting.

Information 1601 is all registered information. The registered information 1601 includes an ID 1602 for uniquely identifying the image forming apparatus and an IP address 1603 of the image forming apparatus, and the IP address is used for communications.

The setting information may be generated by several methods and the present exemplary embodiment is not particularly limited to any one method. For example, an image forming apparatus may be registered by an operator in advance, an image forming apparatus group may be automatically registered which uses the same authentication server, or an image forming apparatus may be automatically registered within the same sub network.

As described above, when a workflow advances and the work item to be executed in an image forming apparatus by a user is generated, the server apparatus 11 displays a button related to execution of a work item on a portal screen of an image forming apparatus. If the work item has been executed in the image forming apparatus, when processing of the work item is completed, the server apparatus 11 deletes a work item execution button at the portal UI side of the image forming apparatus.

According to the exemplary embodiments described above, a workflow desired by a user can be easily implemented without making any change or installing any special application program in an image processing apparatus.

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-266506, filed Oct. 15, 2008, which is hereby incorporated by reference herein in its entirety.

What is claimed is:

1. An information processing apparatus, comprising:
a first acquiring unit configured to acquire setting of a scanning function or a printing function to be executed in an image processing apparatus from an activity corresponding to a work item;
a second acquiring unit configured to acquire user information of a user who can execute the work item based on a role allocated to the work item;
a third acquiring unit configured to acquire function information of a function which can be executed by the image processing apparatus from an image forming apparatus;
a generation unit configured to generate setting information of a button related to execution of the work item, the button being included in a portal screen for each user displayed on the image processing apparatus according to a log-in operation of each user, based on the activity acquired by the first acquiring unit and the user information acquired by the second acquiring unit and the function information acquired by the third acquiring unit, when the work item is generated that is a work unit of a workflow executed in the image processing apparatus that can communicate via a network; and
a transmission unit configured to transmit the setting information generated in the generation unit to the image processing apparatus which can communicate via the network such that, based on the function information acquired by the third acquiring unit, the button is included in a portal screen of the user corresponding to the user information acquired by the second acquiring unit on the image processing apparatus which is able to execute the function according to the setting acquired by the first acquiring unit.

2. The information processing apparatus of claim 1, further comprising a deletion request transmission unit configured to transmit a deletion request of the button related to execution of the work item, which is included in the screen of the image processing apparatus, to the image processing apparatus, in response to access which is made when the button is pressed down, from the image processing apparatus that can communicate via the network.

3. The information processing apparatus of claim 1, further comprising a folder generating unit which generates a folder for each work item to which an access right for a user who can execute the work item is set when the generated work item is a work item related to scan, wherein the generation unit generates setting information which includes location information of the folder and information of a user which has the access right.

4. The information processing apparatus of claim 1, further comprising a print data generating unit which generates print data for each work item to which an access right for a user who can execute the work item is set when the generated work item is a work item related to printing, wherein the generation unit generates setting information which includes location information of the print data and information of a user which has the access right.

5. The information processing apparatus of claim 3, further comprising a control unit which specifies a work item based on the folder, stores the scan data in association with an activity corresponding to the work item or in association with a workflow related to the activity, deletes the folder, and advances a work in the workflow to a next activity when the button is pressed down and scan data is transmitted to the folder from the image processing apparatus that can communicate via a network.

6. The information processing apparatus of claim 4, further comprising a control unit which specifies a work item based on the print data, specifies a workflow related to an activity corresponding to the work item, deletes the print data after waiting for printing completion of the print data ends, and advances a work in the workflow to a next activity when the button is pressed down and a print data acquisition request is transmitted from the image processing apparatus that can communicate via a network.

7. The information processing apparatus of claim 1, wherein when the setting information generated in the generation unit is transmitted to the image processing apparatus that can communicate via the network, the transmission unit acquires function information of the image processing apparatus, determines whether the function for executing the work item related to the setting information is present, and transmits the setting information when it is determined that the function for executing the work item related to the setting information is present.

8. An information processing method of an information processing apparatus, comprising:

acquiring setting of a scanning function or a printing function to be executed in an image processing apparatus from an activity corresponding to a work item;

acquiring user information of a user who can execute the work item based on a role allocated to the work item;

acquiring function information of a function which can be executed by the image processing apparatus from an image forming apparatus;

generating setting information of a button related to execution of the work item, the button being included in a portal screen for each user displayed on the image processing apparatus according to a log-in operation of each user, based on the activity acquired and the user information acquired and the function information acquired, when the work item is generated that is a work unit of a workflow executed in the image processing apparatus that can communicate via a network; and transmitting the setting information generated in the generating of the setting information to the image processing apparatus that can communicate via the network such that, based on the function information acquired by the third acquiring unit, the button is included in a portal screen of the user corresponding to the user information acquired by the second acquiring unit on the image processing apparatus which is able to execute the function according to the setting acquired by the first acquiring unit.

9. The information processing method according to claim 8, further comprising transmitting a deletion request of the button related to execution of the work item, which is included in the screen of the image processing apparatus, to the image processing apparatus, in response to access which is made when the button is pressed down, from the image processing apparatus that can communicate via the network.

10. The information processing method according to claim 8, further comprising generating a folder for each work item to which an access right for a user who can execute the work item is set when the generated work item is a work item related to scan, wherein setting information is generated which includes location information of the folder and information of a user which has the access right.

11. The information processing method according to claim 10, further comprising specifying a work item based on the folder, storing the scan data in association with an activity corresponding to the work item or in association with a workflow related to the activity; deleting the folder, and advancing a work in the workflow to a next activity when the button is pressed down and scan data is transmitted to the folder from the image processing apparatus that can communicate via a network.

12. The information processing method according to claim 8, further comprising generating print data for each work item to which an access right for a user which can execute the work item is set when the generated work item is a work item related to printing, wherein setting information is generated which includes location information of the print data and information of a user which has the access right.

13. The information processing method according to claim 12, further comprising specifying a work item based on the print data, specifying a workflow related to an activity corresponding to the work item, deleting the print data after waiting for printing completion of the print data ends, and advancing a work in the workflow to a next activity when the button is pressed down and a print data acquisition request is transmitted from the image processing apparatus that can communicate via a network.

14. The information processing method according to claim 8, wherein when the setting information generated in the generation unit is transmitted to the image processing apparatus that can communicate via the network, function information of the image processing apparatus is acquired, it is determined whether the function for executing the work item related to the setting information is present, and the setting information is transmitted when it is determined that the function for executing the work item related to the setting information is present.

15. A non-transitory computer readable storage medium storing a program for executing the information processing method according to claim 8.

* * * * *